G. W. PIERCE.
CLUTCH PEDAL RELEASING DEVICE.
APPLICATION FILED APR. 26, 1921.
1,435,732.
Patented Nov. 14, 1922.
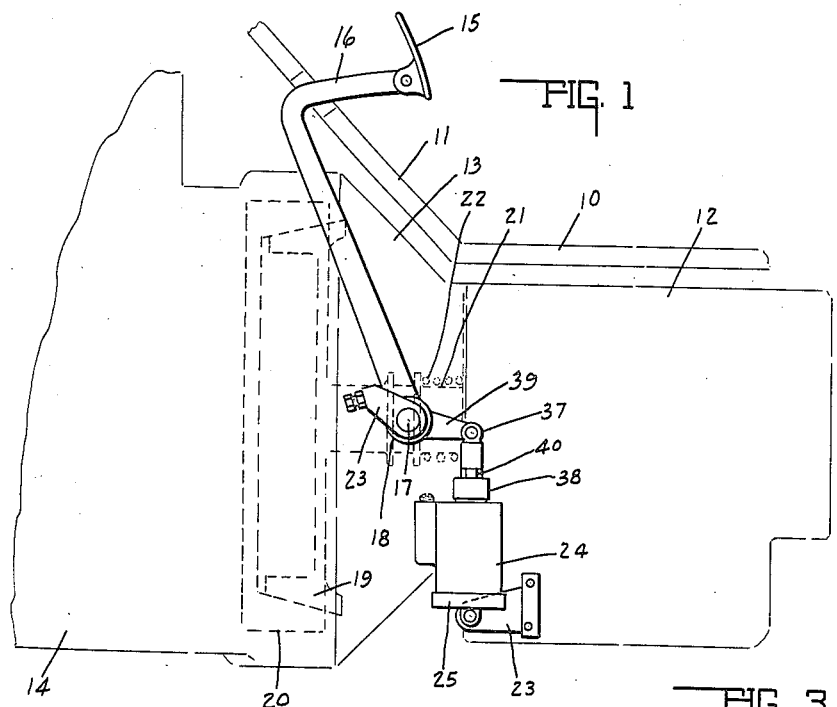
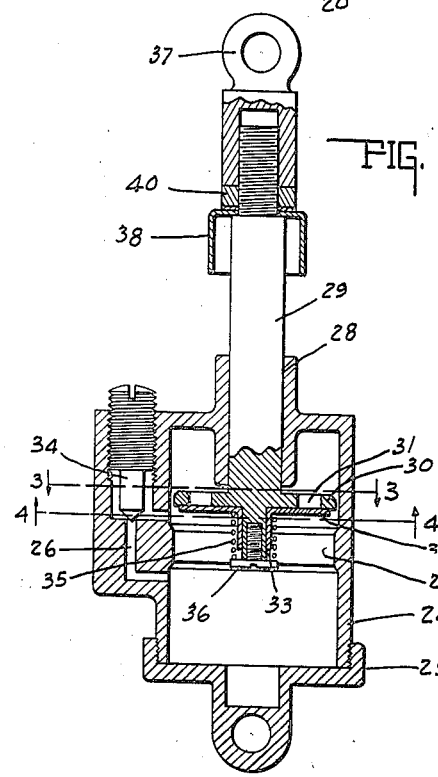
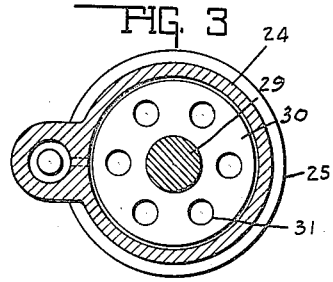
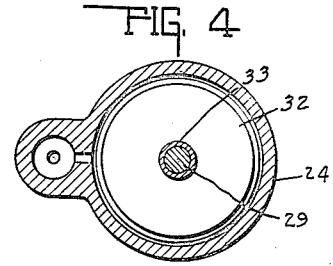
Inventor
GEORGE W. PIERCE.
By Lockwood & Lockwood
Attorneys.

Patented Nov. 14, 1922.

1,435,732

UNITED STATES PATENT OFFICE.

GEORGE W. PIERCE, OF ANDERSON, INDIANA.

CLUTCH-PEDAL-RELEASING DEVICE.

Application filed April 26, 1921. Serial No. 464,616.

*To all whom it may concern:*

Be it known that I, GEORGE W. PIERCE, a citizen of the United States, and a resident of Anderson, county of Madison, and State of Indiana, have invented a certain new and useful Clutch-Pedal-Releasing Device; and I do hereby declare that the following is a full, clear, and exact description thereof, reference being had to the accompanying drawings, in which like numerals refer to like parts.

This invention relates to a device for controlling the clutch of a motor driven vehicle or tractor, and more particularly is adapted to control the release of the manually operated clutch pedal.

In the usual construction of motor propelled vehicles, there is provided a clutch for engaging and disengaging the motor with the driving unit, said clutch being adapted to take hold and operatively connect the motor with the driving unit by frictional engagement of the clutch members. For manually controlling the engagement and disengagement of said clutch members there is usually provided a pedal which operates one of said members under spring tension so that when the pedal is pushed forward, the actuated clutch member will disengage the other member and permit the motor to be disconnected from the driving unit, and upon releasing the clutch pedal, it returns to normal under spring tension and the actuated clutch member frictionally engages the other member so as to operatively connect the motor and driving unit.

Among drivers of motor vehicles, and especially those who are inexperienced and unfamiliar with the fineness of controlling the same, there are those who release the foot pedal and permit the actuated clutch member to quickly engage the other clutch member, thereby causing a jerk on the vehicle because of the suddenness of the connection, which not only is unpleasant to the occupants but causes a terrific strain on the motor and the driving unit. This is overcome by an experienced driver who "slides" his clutch by gradually letting the pedal come back to normal, feeling the clutch gradually take hold so that the motor imparts movement to the vehicle gradually and smoothly such as to eliminate the sudden shock to the driving unit, the occupants and the strain caused thereby.

It is the object of this invention to provide a mechanical device for controlling the clutch in such a way that the pedal may be entirely released when the clutch is out, and the clutch will take hold with the same slow movement as when the driver "slides" his clutch. By means of this device an inexperienced driver, or in fact all drivers may forget the clutch pedal so far as letting it in is concerned, and the clutch will automatically take hold with the same ease and smoothness as if the pedal was carefully manipulated by the driver. Obviously such a device will not only relieve the mind of the driver, but will insure the smooth starting of the vehicle and prevent the damaging of the driving mechanism.

This is accomplished by means of a valve dash-pot connected with the clutch pedal or its associated parts and so arranged that the clutch may be thrown out quickly and may return under spring tension to position for taking hold and then be retarded in its movement by the valve so as to cause it to gradually engage the other clutch member, thus permitting sliding until there is full and complete engagement, upon which said valve permits the foot pedal to quickly return to normal position. This operation controls the clutch in exactly the same manner as the experienced driver when giving it his closest attention.

The full nature of the invention will be understood from the accompanying drawings and the following description and claims.

In the drawings, Fig. 1 is a side elevation of a clutch pedal and the controlling device attached thereto, and the portion of the vehicle upon which it is mounted. Fig. 2 is a central vertical cross section taken through the controlling device. Fig. 3 is a section taken on the line 3—3 of Fig. 2. Fig. 4 is a section taken on the line 4—4 of Fig. 2.

In the drawings there is shown a portion of a vehicle having a floor-board 10, and a foot-board 11 under which is mounted the transmission housing 12 which is secured to the rear of the fly-wheel housing 13 and the crankcase 14. There is provided a foot pedal 15 pivotally mounted on the crank arm 16 which extends through the foot-board and is rigidly secured to a transverse yoke shaft 17 mounted in suitable bearings, which is provided with a yoke, not shown, adapted to engage in the collar 18. The collar 18 forms a part of the cone clutch member 19 which is adapted to extend into and fractionally engage the inner tapered surface of the other clutch member comprising the fly-wheel 20. The collar 18 and the clutch member 19 are slidably keyed to the shaft 21 supported in suitable bearings in the transmission housing and adapted to connect with the drive shaft. Mounted about the shaft 21, there is a spiral compression spring 22 arranged to exert a constant pressure against the collar for normally tending to force the clutch member 19 into engagement with the fly-wheel 20. The shaft 17 is provided with a stop arm 23 for limiting the movement thereof. The above described construction does not involve any features of this invention, but it is illustrative of one type of clutch and pedal mechanism.

Mounted on a bracket 23 secured to the transmission housing, frame or any other suitable part of the chassis, there is a dash pot valve having a cylinder 24 mounted on the base 25 and closed at the top. The wall of the cylinder is provided with an inwardly extending peripheral shoulder or annular rib 27 at aproximately the center thereof. The top is provided with the bearing 28 through which the piston rod 29 extends, said piston rod being provided with a piston 30 having a plurality of circumferential holes or openings 31. Mounted adjacent the under side of the piston 30, there is a disk-like valve member 32 having a collar 33 slidably mounted on the lower extension of the piston rod. Surrounding the collar 33, there is a spiral compression spring 35 supported in position by the screw cap 36 adapted to screw into the lower end of the rod 29. The upper end of the rod 29 is screw-threaded and is provided with an eye-nut 37 screwed thereon. For protecting the interior of the cylinder from dust and dirt, there is a cap 38 mounted on said rod so as to cover the upper bearing portion 28 when the piston is in normal position as shown in Fig. 1. The eye-nut 37 is pivotally attached to the end of the arm 39 which is rigidly secured to the lower end of the crank arm 16 and shaft 17.

On the side of the cylinder, there is a by-pass 26 around the shoulder 27 to allow the passage of oil past the piston in its downward movement past the shoulder. To control the movement of the piston, the by-pass 26 is provided with the adjustable valve 34 for controlling the passage of oil therethrough.

The operation of the device is as follows: The cylinder is filled with oil and is normally in the position shown in Fig. 1, with the piston in the lower part of the cylinder. Upon the clutch being thrown out of engagement by pressing the clutch pedal forward, and compressing the spring 22, the piston is raised to the position shown in Fig. 2. The piston may be quickly and readily raised to this position against the oil contained in the cylinder, since the oil may pass around the piston until it reaches the reduced portion 27, and then quickly passes through the holes 31, forcing the valve disk 32 down against the spring 35 and escaping to the lower part of the cylinder. Therefore, in the upward movement of the valve, provision is made for the rapid passage of the oil contained in the upper part of the cylinder through the piston to the lower part of the cylinder. When the clutch pedal is released, the spring 22 will force the clutch into approximate engagement with the fly-wheel 20, casuing the piston to descend in the cylinder and the oil to pass around the periphery thereof until the piston reaches the reduced portion or shoulder 27. At this point the adjustment is such that the clutch will be ready to take hold, but the oil contained in the cylinder will prevent the rapid lowering of the piston when it reaches this point, as there is no means of escape around the periphery thereof. Therefore, the clutch will be retarded and will gradually be permitted to move further into engagement as the oil passes through the controlled by-pass 26. The slow engaging movement of the clutch so as to permit the sliding thereof is, therefore, affected by the gradual passage of the oil through the valve-controlled by-pass 26 and the slow descent of the piston in the cylinder until said piston passes the reduced portion 27, after which the oil may readily pass about its periphery. At this point the adjustment of the device is such that the clutch has taken firm hold with the fly wheel and the pedal is fully released, the entire mechanism returning to normal position.

It is obvious that such a device will not only be applicable to the cone clutch type, but to the multiple disk clutch as well, and adjustment may be had for causing the piston to reach the reduced portion 27 just as the clutch is about to take hold, by adjusting the nut 37 on the rod 29, and locking it in adjusted position by means of a lock nut 40.

The invention claimed is:

1. In combination with the clutch mechanism of a motor vehicle, including means for disengaging said clutch, and means for returning said clutch to engaged position, of a controlling device for retarding the engaging movement of said clutch, comprising means for automatically retarding the returning movement of said clutch, said means resisting the return movement to a minimum degree during the initial and final returning movement of said clutch and resisting said returning movement to a maximum degree during an intermediate portion of the return movement of said clutch, substantially as described.

2. In combination with a clutch mechanism of a motor vehicle, comprising means for disengaging said clutch, and means for returning said clutch to engaged position, of a controlling device for retarding the engaging movement of said clutch, comprising a dash pot cylinder, a fluid contained in said cylinder, and a piston operatively connected with said clutch mechanism adapted to be retarded by the fluid contained in said cylinder, and means positioned on said cylinder for automatically resisting the returning movement of said clutch to a maximum degree during an intermediate portion of the movement thereof, and permitting the return of said clutch by resisting to a minimum degree during the initial and final movement thereof.

3. In combination with the clutch mechanism of a motor vehicle, means for disengaging said clutch, and means for returning said clutch to engaged position, of a controlling device for retarding the engaging movement of said clutch, comprising a dash-pot cylinder an annular rib positioned internally between the ends of said cylinder for providing a restricted opening, a fluid contained in said dash-pot cylinder, and a piston operatively connected with said clutch mechanism of substantially the same diameter as the internal diameter of said annular rib and of less diameter than the remaining portion of said cylinder, whereby said fluid may readily pass about the periphery of said piston and permit the free movement thereof in said cylinder excepting through the passage of said piston through said annular rib.

4. In combination with the clutch mechanism of a motor vehicle, means for disengaging said clutch, and means for returning said clutch to engaged position, of a controlling device for retarding the engaging movement of said clutch comprising a dash-pot cylinder an annular rib positioned internally between the ends of said cylinder for providing a restricted opening, a fluid contained in said dash-pot cylinder, a piston operatively connected with said clutch mechanism of substantially the same diameter as the internal diameter of said annular rib and of less diameter than the remaining portion of said cylinder, whereby said fluid may readily pass about the periphery of said piston and permit the free movement thereof in said cylinder excepting through the passage of said piston through said annular rib, and means for adjusting said piston with respect to said clutch mechanism, whereby said piston will enter and pass through said annular rib during the actual engaging movement of said clutch mechanism.

In witness whereof, I have hereunto affixed my signature.

GEORGE W. PIERCE.